United States Patent [19]

Mansell

[11] 3,731,106
[45] May 1, 1973

[54] BEAM SCANNER FOR HIGH POWER LASER

[75] Inventor: Dennis N. Mansell, Palos Verdes Peninsula, Calif.

[73] Assignee: The United States of America as represented by the Secretary of the Air Force

[22] Filed: Nov. 16, 1971

[21] Appl. No.: 199,185

[52] U.S. Cl. ..........................250/236 R, 331/94.5 A
[51] Int. Cl. ..................................................H01j 5/16
[58] Field of Search...................331/94.5 K, 94.5 M; 356/225; 250/235, 236, 237

[56] References Cited

UNITED STATES PATENTS

| | | | |
|---|---|---|---|
| 3,524,145 | 8/1970 | Fowler | 331/94.5 K |
| 3,465,352 | 9/1969 | Carlson | 331/94.5 A |
| 3,408,656 | 10/1968 | Lamberts | 331/94.5 A |
| 3,527,520 | 9/1970 | Harris | 331/94.5 K |

*Primary Examiner*—James W. Lawrence
*Assistant Examiner*—D. C. Nelms
*Attorney*—Harry A. Herbert, Jr. et al.

[57] ABSTRACT

Beam scanning of high power laser beam is accomplished by sequentially deflecting successive thin layers of the beam in such a way that each thin strip of deflected laser light passes across a narrow aperture mask. The laser light passing through the aperture is effectively a scan of that layer of the laser beam. It is subsequently focused onto an appropriate laser beam detector. A spiral arrangement of radial reflector rods mounted on a rotatable drum support structure is used to achieve sequential deflection of successive layers of the laser beam.

2 Claims, 2 Drawing Figures

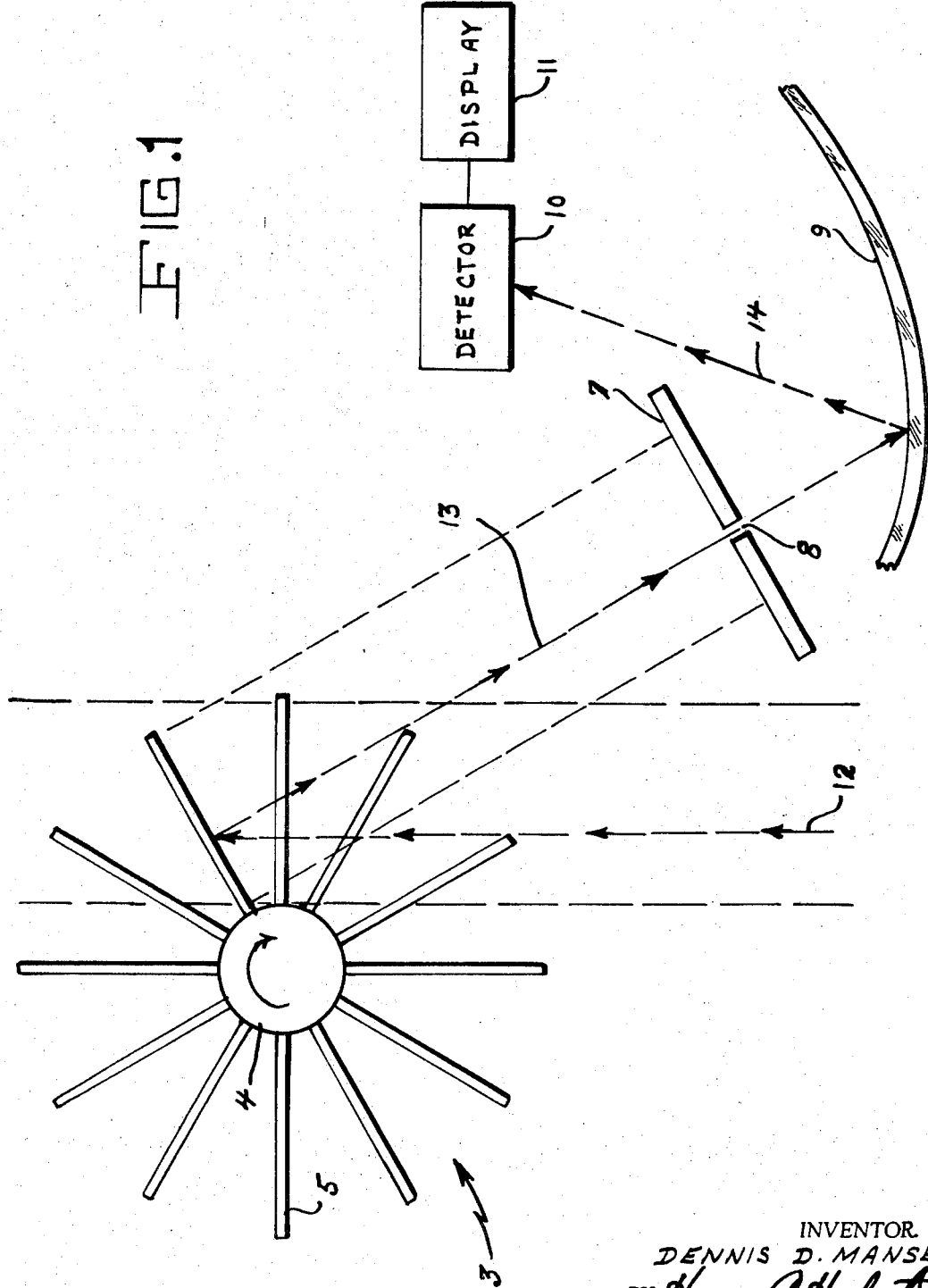

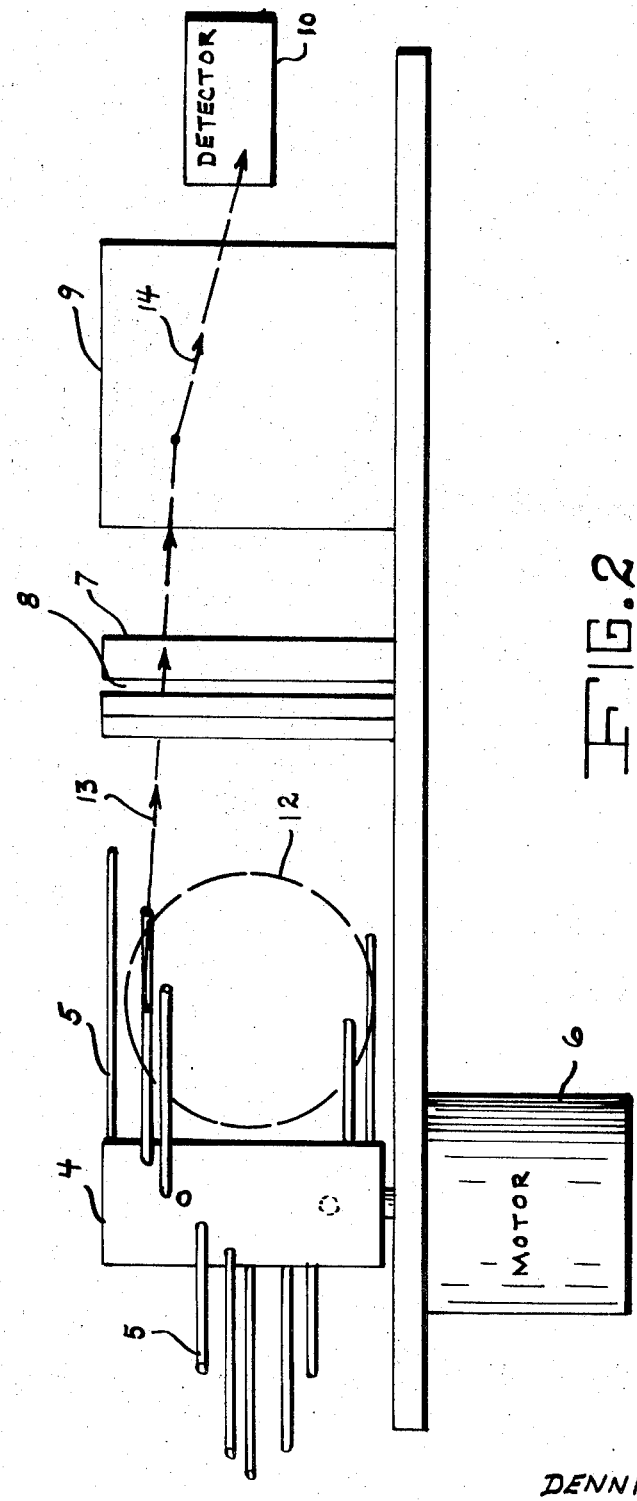

BEAM SCANNER FOR HIGH POWER LASER

BACKGROUND OF THE INVENTION

This invention relates to high power laser systems and in particular to apparatus capable of scanning the beam of such a system during its operation.

It is often desirable to evaluate high power laser beams for spatial power distribution. Frequently such an evaluation should be done while the laser beam is in use. Also monitoring of the beam in operational laser systems may be required. In these instances the conventional method of inserting screens or probes into the beam introduces severe discontinuities into the delivered beam and substantially reduces its operational effectiveness. Furthermore the screens or probes, if held in a stationary position in the beam for any length of time, can be severely damaged or destroyed. There currently exists therefore a need for apparatus capable of scanning a high power laser beam while the beam is in use. It is also desirable that such apparatus be unaffected by the laser beam and that the apparatus itself does not adversely affect the usable beam to any substantial degree.

SUMMARY OF THE INVENTION

The present invention comprehends a turnstyle arrangement of elongated thin reflector elements. The elements are arranged in different horizontal levels and the turnstyle is rotated so that the reflector elements sequentially sweep through the laser beam. Each reflection element deflects a narrow strip of laser light in a manner similar to the sweeping beam of a spotlight. A mask having a vertical slot aperture is positioned in the sweep path. As the strip of deflected laser light sweeps across the slit aperture the light passing through the aperture is effectively a sweep of that portion of the reflected layer of laser beam. A focus mirror is used to focus the light passing through the aperture onto an appropriate laser light detector. As the reflector elements sweep through the laser beam at successively lower levels the beam is analyzed in levels from side to side and from top to bottom. This is repeated with each revolution of the turnstyle.

It is a principal object of the invention to provide new and improved apparatus for scanning a high power laser beam.

It is another object of the invention to provide apparatus for scanning a high power laser beam that can be used while the laser is in use.

It is another object of the invention to provide apparatus for scanning a high power laser beam that does not adversely affect the quality of the delivered laser beam.

It is another object of the invention to provide apparatus for scanning a high power laser beam that is not adversely affect by the laser beam.

These, together with other objects, features and advantages of the invention, will become more apparent from the following detailed description when taken in conjunction with the illustrated embodiment in the accompanying drawings.

DESCRIPTION OF THE DRAWINGS

FIG. 1 is a plan view of the apparatus of the apparatus of the present invention; and FIG. 2 is a view in elevation of the apparatus of FIG. 1.

DETAILED DESCRIPTION OF THE PREFERRED EMBODIMENT

Referring now to FIGS. 1 and 2, there is illustrated thereby one presently preferred embodiment of the invention. Reflector elements 5 are radially disposed on the outer peripheral surface of support structure drum 4 in the spiral configuration shown (FIG. 2). Reflector elements can be wires or thin tubes or any other appropriate reflecting elements. The reflectors are swept through laser beam 12 by rotating support structure 4 by means of motor 6. Cooling of the wires or tubes can be accomplished by using a cold gas bath in the case of the wires or a high pressure cold gas flow in the case of the tubes. The reflected laser beam 13 deflected by the deflecting elements sweeps across mask 7 as the deflecting elements move through the laser beam. Vertical slit aperture 8 permits a small increment of the reflected beam to pass to focus mirror 9 whereby it is focused on the light receiving member of laser detector 10. The output of detector 10 can then be displayed on display 11 or it can be recorded by any convenient recording means. The arrangement of components thus disclosed operates to reflect successive layers of the laser beam (from top to bottom) and scans each layer (from left to right) by means of the apertured mask. Each complete revolution of support structure 4 therefore provides a complete scan of the laser beam while introducing only a small disturbing element into the beam.

Although the present invention has been described with reference to a specific embodiment, it is not intended that the same should be taken in a limiting sense. Accordingly it is understood that the scope of the invention in its broader aspects is to be defined by the appended claims only and no limitation is to be inferred from definite language used in describing the preferred embodiment.

I claim:

1. In combination with a laser system adapted to generate a high power laser beam, a beam scanner comprising
    means for sequentially deflecting successive layers of the laser beam,
    means for scanning each said deflected layer of laser beam,
    a laser beam detector, and
    means for focusing the scanned laser beam onto said laser beam detector, said means for deflecting layers of the laser beam comprising
    a cylindrical support structure,
    a multiplicity of reflector rods, said rods being radially mounted in a spiral configuration on the peripheral surface of said cylindrical support structure, and
    means for rotating said cylindrical support structure about its longitudinal axis.

2. A beam scanner as defined in claim 1 wherein said means for scanning deflected layers of laser beam comprises a mask member disposed between said means for deflecting layers of laser beam and the focusing means, said mask member having a slit aperture therein, said slit aperture being perpendicular to the deflected layers of laser beam.

* * * * *